Figures 1, 2:
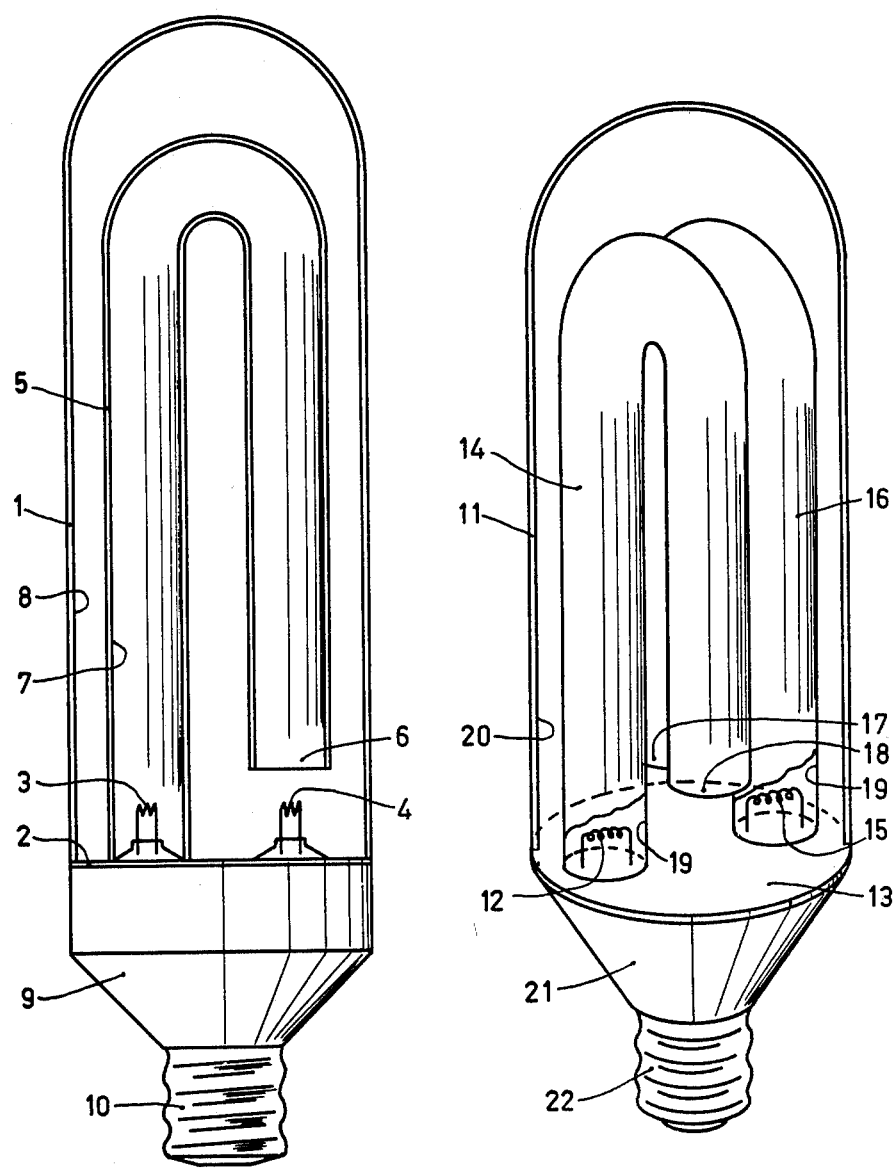

United States Patent [19]

Lauwerijssen et al.

[11] 4,199,708

[45] Apr. 22, 1980

[54] LOW-PRESSURE MERCURY VAPOR DISCHARGE LAMP

[75] Inventors: Petrus C. Lauwerijssen; Antonius J. van Meer, both of Roosendaal, Netherlands

[73] Assignee: U.S. Philips Corporation, New York, N.Y.

[21] Appl. No.: 934,988

[22] Filed: Aug. 18, 1978

[30] Foreign Application Priority Data

Aug. 23, 1977 [NL] Netherlands .................... 7709265

[51] Int. Cl.² .................. H01J 61/04; H01J 61/35; H01J 61/44
[52] U.S. Cl. ................................ 313/493; 313/205; 313/220
[58] Field of Search .............. 313/493, 485, 204, 205, 313/220

[56] References Cited

U.S. PATENT DOCUMENTS

| | | | |
|---|---|---|---|
| 1,921,620 | 8/1933 | Kayko | 313/205 |
| 1,935,697 | 11/1933 | Davies et al. | 313/205 |
| 1,971,944 | 8/1934 | Wiegand | 313/205 |
| 2,001,501 | 5/1935 | Rüttenauer et al. | 313/205 |
| 2,561,868 | 7/1951 | Jenkins et al. | 313/205 X |
| 2,788,462 | 4/1957 | MacFarlane | 313/205 |
| 2,831,152 | 4/1958 | Dziergwa | 313/204 X |

FOREIGN PATENT DOCUMENTS

| | | | |
|---|---|---|---|
| 1060766 | 11/1953 | France | 313/204 |
| 178684 | 10/1935 | Switzerland | 313/220 |
| 424798 | 3/1976 | U.S.S.R. | 313/220 |

*Primary Examiner*—Palmer C. Demeo
*Attorney, Agent, or Firm*—Robert S. Smith

[57] ABSTRACT

Low-pressure mercury vapor discharge lamp having a closed elongated lamp envelope and comprising at least two electrodes disposed near a first end of the lamp envelope, at least one electrode is situated at the end of at least one inner tube situated within and sealed in a gas-tight manner to the lamp envelope, this inner tube having at least one opening to the inside of the lamp envelope, the inner tube being U-shaped.

7 Claims, 2 Drawing Figures

LOW-PRESSURE MERCURY VAPOR DISCHARGE LAMP

The invention relates to a low-pressure mercury vapor discharge lamp having an enclosed space defined by a lamp envelope and comprising at least two electrodes disposed in said space near one end of the lamp envelope. At least one of the electrodes is situated at one end of a respective inner tube situated within the lamp envelope and sealed thereto in a gas-tight manner, this inner tube having an opening to the lamp space limited by the lamp envelope. Such a lamp is disclosed in U.S. Pat. No. 2,001,501.

By folding the discharge path a compact low-pressure mercury vapor discharge lamp can be obtained. The above-mentioned patent specification describes a low-pressure mercury vapor discharge lamp having a so-called "folded" discharge path and one of the electrodes being situated in one end of a helical inner tube disposed in a gas-tight manner near one of the two adjacent electrodes. The other end of the inner tube of the lamp described in said U.S. patent specification is in an open connection with the space limited by the lamp envelope and is situated near the end of the lamp envelope remote from the two electrodes. The discharge travels from one electrode through the inner tube and leaves it at the open end and thereafter directly travels through the space limited by the lamp envelope to the other electrode. Such a lamp has the drawback that the shape of the inner tube is complicated from the glass technological point of view. In addition, providing a luminescent coating on the inner wall of such an inner tube is a complicated process. Furthermore a lamp according to the U.S. patent specification has the drawback that owing to the large distance from the open end of the inner tube to the electrode which is not situated in the inner tube it is usually necessary to also provide the inner wall of the lamp envelope with a luminescent coating.

It is an object of the invention to provide a low-pressure mercury vapor discharge lamp which can be manufactured in a simple manner, which has a high luminous flux per unit of lamp envelope and which is of such a shape that it can be used in a simple manner in existing luminaires for conventional incandescent lamps.

A low-pressure mercury vapor discharge lamp of the type defined above is characterized in accordance with the invention in that the inner tube has a U-shaped section.

A U-shaped inner tube or discharge tube is here understood to mean a tube having two straight sections which are interconnected to a curved section. Optionally, the legs of the U-shaped inner tube are bent over an angle of 180° in a plane perpendicular to the plane through the two legs.

Although the operating temperature of the lamp according to the invention is relatively high the optimum vapor pressure for converting electric power into ultraviolet radiation hardly increases. This is due to the fact that the vapor pressure in the lamp, and hence in the inner tube, is now determined by the relatively cool wall of the lamp envelope.

By choosing a U-shape for the inner tube such inner tubes can be, considered from the glass technological point of view, easily produced and assembled in the lamp.

The use of a U-shaped discharge tube having openings to a space limited by a lamp envelope is known per se from the United Kingdom Patent Specification No. 669,032. In the lamp disclosed in that Patent Specification the openings are provided in the form of slits at the end of the legs near the electrodes in order to discharge certain contaminants from the discharge tube. The use of these slits near the ends of the inner tube renders the connection to the lamp envelope vulnerable and additional auxiliary means are required for a proper centering of the inner tube.

In an embodiment of a lamp according to the invention one of the legs of the U-shaped inner tube has an opening which is situated near the end of the lamp envelope where the electrodes are disposed.

Such a construction can be produced in a simple manner because fixing means for only one end of the U-shaped inner tube need be provided in said end of the lamp envelope. Actually, the opening is then disposed at the free end of the inner tube. It is not necessary then to make more openings in the inner tube, nor is it necessary then to coat the inner wall of the lamp envelope with a luminescent material.

In a further embodiment of a lamp according to the invention one electrode is disposed in an end, which is sealed-off in a gas-tight manner, of a first U-shaped inner tube and the second electrode in a likewise gas-tight sealed end of a second U-shaped inner tube, the other ends of the U-shaped inner tubes being open.

In such a lamp discharge travels from one electrode through the first U-shaped inner tube, leaves it through the open end to cross thereafter over to the open end of the second U-shaped inner tube and travels thereafter through the second U-shaped inner tube to the other electrode. This embodiment has the advantage that for these small, short lamps the operating voltage of the lamp can be chosen to be relatively high so that the energy losses at the electrodes are as low as possible, whereas, in addition, the dimensions of the required electric stabilization ballast can be small.

The end of the lamp envelope where the electrodes are disposed preferably comprises a chromium-iron plate in which the feedthroughs of the electrodes are arranged. The inner tubes can be secured in a gas-tight manner on this plate, for example by means of glass seal. The glass lamp envelope can be easily fitted to this plate, by means of a glass seal.

The inside diameter of the inner tube is preferably between 5 mm and 15 mm, the inner wall of the inner tube being coated with a layer of luminescent material consisting of a mixture of three phosphors, namely blue luminescent, bivalent europium-activated barium magnesium aluminate, green luminescent, terbium-activated cerium magnesium aluminate and red luminescent, trivalent europium-activated yttrium oxide (see United Kingdom Patent Specification Nos. 1,458,700 and 1,452,083).

With this embodiment of a lamp according to the invention the column gradient of the discharge in the inner tube is high. Combined with the luminescent materials mentioned above, which are resistant to the action of the radiation generated by the discharge in the relatively narrow tubes, lamps are obtained having a high luminous flux per unit of lamp volume.

In this manner compact lamps having very small dimensions are obtained so that, provided with the suitable lamp base, in which a glow discharge starting switch and an electric stabilization ballast are disposed they may serve for use in luminaires for incandescent lamps for general illumination purposes. In addition, the luminous efficiency of the small discharge lamps is favorable compared with said incandescent lamps.

The inner wall of the lamp envelope is preferably coated with a layer of light-dispersing material, such as finely dispersed calcium and/or strontium pyrophosphate and/or titanium oxide. This results in a lamp having a very uniform light distribution.

The invention will be further explained with reference to a drawing.

In the drawing

FIG. 1 shows diagrammatically a longitudinal section of an embodiment of a low-pressure mercury vapor discharge lamp according to the invention, provided with an U-shaped inner tube, one of the legs of which has an opening situated near the end of the lamp envelope and FIG. 2 shows an embodiment of a low-pressure mercury vapor discharge lamp according to the invention, two U-shaped inner tubes being disposed in the lamp envelope.

In FIG. 1 a glass lamp envelope is indicated by 1. Two thermally emitting electrodes 3 and 4 are both disposed near one end 2 (which consists of a chromium-iron plate) of this envelope. An U-shaped inner tube 5 is fitted around electrode 3 in a gas-tight manner as hereinbefore defined by means of a glass seal. One leg of this inner tube is provided with an opening 6, which opens into the space limited by the lamp envelope 1 and which is near the electrode 4. Provided on the inner wall of the U-shaped inner tube is a luminescent coating 7, consisting of a mixture of three phosphors, namely blue luminescent bivalent europiumactivated barium magnesium aluminate, green luminescent terbium-activated cerium magnesium aluminate and red luminescent trivalent europium-activated yttrium oxide. The inner wall of the lamp envelope is provided with a light dispersing layer 8, consisting of finely dispersed strontium pyrophosphate and/or titanium dioxide. In addition, the lamp is provided with a lamp base 9, wherein a glow discharge starter and an inductive stabilization ballast (not shown) are disposed, so that the lamp can be directly screwed into a conventional incandescent lamp luminaire by means of a suitable threaded sleeve 10. Alternatively, these electric components can be accommodated in a separate, detachable adapter. In a typical embodiment, the overall length of the U-shaped inner tube is 20 cm; its inside diameter is approximately 7 mm. At a power supplied to the lamp of 18 watts, an operating voltage of 56 volts and a pressure of 4 torr of argon the luminous flux of this lamp is approximately 675 lumen.

The lamp shown in FIG. 2 likewise comprises a glass lamp envelope, indicated by 11. One electrode 12 is disposed in an end, which end is sealed in a gas-tight manner by means of a glass seal to a chromium iron base plate 13, of a first U-shaped inner tube 14. The second electrode 15 is situated in an end, which is likewise sealed in a gas-tight manner to the plate 13, of a second U-shaped inner tube 16. The other ends, 17 and 18 respectively, of the U-shaped inner tubes are open. A coating of luminescent material, consisting of a mixture of the same phosphors as for the lamp shown in FIG. 1 is applied to the inner wall 19 of the inner tubes. The inner wall 20 of the lamp envelope is provided with a light-dipersing layer of finely dispersed calcium and/or strontium pyrophosphate and/or titanium dioxide. Also this lamp is provided with a lamp base 21 with sleeve 22. The overall length of each of the U-shaped inner tubes is approximately 20 cm so that the length of the entire discharge path is approximately 42 cm. The inside diameter of the lamp envelope 1 is approximately 40 mm. The inside diameter of the inner tube is approximately 7 mm. With a power supplied to the lamp of 22 watts, an operating voltage of approximately 120 volts and a pressure of 4 torr of argon the luminous flux of this lamp is approximately 950 lumen.

What is claimed is:

1. A low-pressure mercury vapor discharge lamp comprising:

a closed elongated lamp envelope having first and seconds ends, a first U-shaped inner tube having first and second generally parallel legs and disposed in said envelope having (1) a first end sealed in a gas tight manner to said first end of said envelope and (2) a second open end in fluid communication with the interior of said lamp envelope, and first and second electrodes disposed proximate to said first end of said lamp envelope, said first electrode being disposed within said first end of said tube.

2. A low-pressure mercury vapor discharge lamp as claimed in claim 1, wherein said second end of said first tube is disposed near said first end of said lamp envelope.

3. A low-pressure mercury vapor discharge lamp as claimed in claim 1 or 2, further including a second U-shaped inner tube having first and second generally parallel legs and disposed in said envelope having (1) a first end sealed in a gas tight manner to said first end of said envelope and (2) a second open end in fluid communication with said lamp envelope, and said second electrode is disposed in said first end of said second tube.

4. A low-pressure mercury vapor discharge lamp as claimed in claim 1 or 2, wherein said first end of said lamp envelope where said electrodes are disposed comprises a chromium-iron plate, said lamp further including electric power feed-throughs for said electrodes extending through said chromium-iron plate.

5. A low-pressure mercury vapor discharge lamp as claimed in claim 1 or 2, wherein the inside diameter of said inner tube is between 5 mm and 15 mm and the inner wall of the inner tube is coated with a layer of luminescent material comprising a mixture of blue luminescent bivalent europium-activated barium magnesium aluminate, green luminescent terbium-activated cerium magnesium aluminate and red luminescent trivalent europium-activated yttrium oxide.

6. A low-pressure mercury vapor discharge lamp as claimed in claim 1 or 2, wherein the inner wall of said lamp envelope is coated with a layer of light-dispersing material.

7. A low-pressure mercury vapor discharge lamp as claimed in claim 6, wherein said light-dispersing material comprises a finely dispersed material selected from the group consisting of calcium pyrophosphate, strontium pyrophosphate and titanium dioxide.

* * * * *